United States Patent [19]

Kopke

[11] Patent Number: 4,688,543
[45] Date of Patent: Aug. 25, 1987

[54] COLLAPSIBLE GRILL

[76] Inventor: Robert J. Kopke, 3516 Windsor Dr., Boise, Id. 83705

[21] Appl. No.: 838,909

[22] Filed: Mar. 12, 1986

[51] Int. Cl.⁴ .................................................. F24B 3/00
[52] U.S. Cl. .............................. 126/25 A; 126/25 R; 126/9 R; 126/29
[58] Field of Search .................. 126/25 R, 25 A, 29, 126/9 R, 9 B

[56] References Cited

U.S. PATENT DOCUMENTS

| | | |
|---|---|---|
| 943,569 | 12/1909 | Scamardi . |
| 1,091,877 | 3/1914 | Collis . |
| 1,244,357 | 10/1917 | Moore . |
| 1,483,420 | 2/1924 | Ewing . |
| 1,830,230 | 11/1931 | Gwyer .............................. 126/9 B |
| 2,058,172 | 10/1936 | Myers ................................ 126/29 |
| 2,173,024 | 9/1939 | Park .................................... 126/30 |
| 2,469,698 | 5/1949 | Morgan ............................ 248/166 |
| 2,986,138 | 5/1961 | Moore et al. ................... 126/25 A |
| 3,025,849 | 3/1962 | Zimmerman ...................... 126/43 |
| 3,149,623 | 9/1964 | Orr, Jr. ................................. 126/9 |
| 3,224,357 | 12/1965 | Rubens ............................. 99/259 |
| 3,785,360 | 1/1974 | Martin ............................. 126/9 R |
| 3,837,328 | 9/1974 | Schaffer ............................ 126/29 |
| 4,109,567 | 8/1978 | Gage et al. ....................... 99/450 |
| 4,120,237 | 10/1978 | Mecherlen ....................... 99/340 |
| 4,230,089 | 10/1980 | Barden ............................ 126/30 |
| 4,393,857 | 7/1983 | Sanford ......................... 126/9 R |
| 4,432,334 | 2/1984 | Holt ............................... 126/9 B |

Primary Examiner—Carroll B. Dority, Jr.
Attorney, Agent, or Firm—Price, Heneveld, Cooper, DeWitt & Litton

[57] ABSTRACT

A collapsible grill having two separate sections adapted to be interlocked, one to the other, by a latching mechanism. The grill is supported above a bed of charcoal or the like by means of three stakes, each stake including a series of upwardly opening recesses whereby the height of the grill can be adjusted.

14 Claims, 5 Drawing Figures

COLLAPSIBLE GRILL

BACKGROUND OF THE INVENTION

This invention relates to collapsible grills and, more particularly, to lightweight, collapsible grills which, when assembled and utilized for cooking, are sturdy and which, yet, are economical to manufacture.

Collapsible grills have been proposed heretofore. Examples are shown in U.S. Pats. Nos. 4,393,857, issued July 19, 1983, to Sanford; 4,109,567, issued Aug. 29, 1978, to Gage et al.; 3,837,328, issued Sept. 24, 1974, to Schaffer; 3,785,360, issued Jan. 15, 1974, to Martin; 3,149,623, issued Sept. 22, 1964, to Orr, Jr.; 2,469,698, issued May 10, 1949, to Morgan; 2,058,172, issued Oct. 20, 1936, to Myers; and 1,244,357, issued Oct. 23, 1917, to Moore. The collapsible grills which are the subject of these patents tend to be either expensive to manufacture, clumsy to use, bulky from a space standpoint, relatively heavy or insufficiently rigid when assembled to be serviceable.

The collapsible grill which is the subject of the present invention, in contrast, is inexpensive to manufacture, easy to use, not bulky from a space standpoint, lightweight and rigid when assembled.

SUMMARY OF THE INVENTION

The collapsible grill which is the subject of the present invention comprises a pair of grill sections, each of said sections including a generally U-shaped peripheral frame member having a series of generally parallel food-contacting members overlying and affixed thereto. The food-contacting members define a cooking area within the boundaries of said frame members having at least one straight side. At least one interlock member underlies the food-contacting members on each of the sections within the cooking area, the interlock member being affixed to the food-contacting members. The interlock members include means for interlocking the sections together with the straight sides thereof adjacent one another so as to form a generally planar cooking surface.

Where the collapsible grill is to be utilized for camping, backpacking or the like, there are also provided a plurality of supports for retaining the assembled sections in adjustable, elevated relationship with respect to a bed of charcoal or the like. Each of the supports includes a series of vertically spaced, upwardly opening recesses within which the peripheral frame members of each of the assembled sections is adapted to rest. The lower extremities of these supports may be pointed to facilitate insertion of them into the ground.

DETAILED DESCRIPTION OF THE PREFERRED EMBODIMENT

The collapsible grill 10 which is the subject of the present invention includes a pair of identical grill sections, 12a and 12b. Each of the sections includes a generally U-shaped peripheral frame member, 14a and 14b, which, in accordance with the preferred embodiment of the invention, is formed as a semi-circle. A series of foodcontacting members, 16a and 16b, overlie the respective peripheral frame members, 14a and 14b, and are affixed thereto at each extremity by conventional methods such as tack welding, etc. The peripheral frame member and parallel food-contacting member 16 of each section define a cooking area bounded by the frame member and a straight side, generally the innermost food-contacting members, 16a' and 16b'. The straight sides of each of the sections lie adjacent one another when the collapsible grill is assembled.

Figure 2:
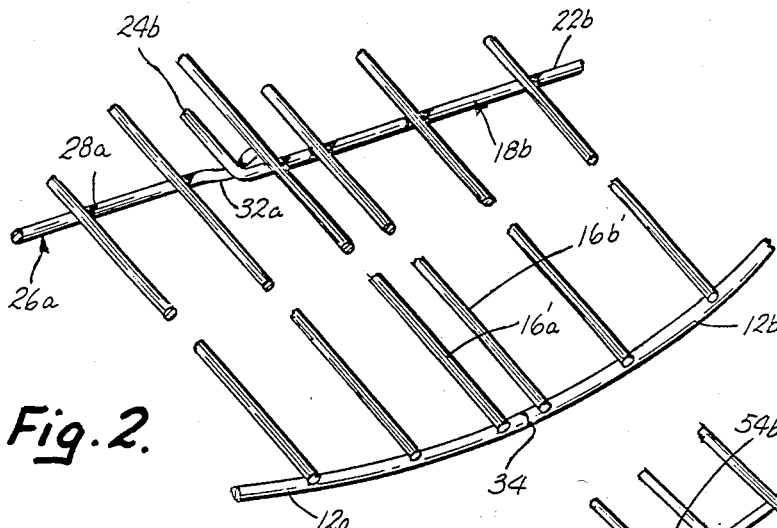
FIG. 2 is an exploded, fragmentary perspective view of the area delineated by the Roman numeral II in FIG. 1.
Figure 3:
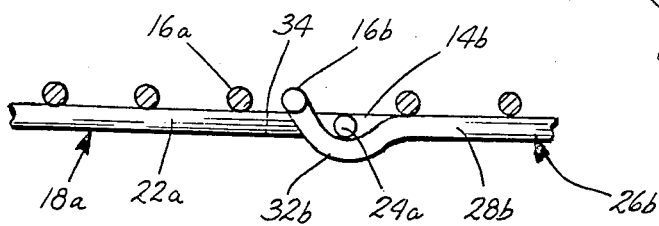
FIG. 3 is a cross section taken along the plane III—III in FIG. 1.

As shown best in FIGS. 2 and 3, each of sections 12a and 12b is provided with a pair of interlock members, which underlie and are affixed to food-contacting members 16a and 16b. The latching interlock members, 18a and 18b, each comprise an elongated body section, 22a and 22b, having a latch, 24a and 24b, formed at the innermost extremity thereof in the form of a right-angle bend. As is apparent from FIG. 2, the innermost extremity of elongated body sections 22a and 22b and the latches 24a and 24b extend inwardly without the cooking area of the particular section to which they are affixed so as to be in a position to underlie at least one food-contacting member of the other section when the two sections are assembled together for cooking.

Each of the grill sections 12a and 12b is also provided with a second interlock member, 26a and 26b, also including an elongated body section, 28a and 28b, affixed to the food-contacting members which they underlie. Interlock members 26a and 26b are formed so as to include an upwardly opening notch or bend, in accordance with the preferred embodiment of this invention, underlying the space between the innermost food-contacting members, 16a' and 16b', and the adjacent food-contacting member on each section. The depth of notches 32a and 32b is equal, approximately, to the diameter of the stock from which the interlock members are fabricated so that the grill, when assembled, will provide a generally planar cooking surface.

The grill sections 12a and 12b are assembled by placing them at an acute angle with respect to one another and protruding the latch of each between the adjacent food-contacting members of the other section at the notches The sections are then shifted sideways with respect to one another to nest the latches within the notches and bring the elongated body sections into contact with one another. The sections are thereafter pivoted into a planar relationship causing latch members to bear downwardly within the notches and the innermost food-contacting members, 16a' and 16b', to bear downwardly on the elongated body sections. This stabilizes the planar relationship of the two sections when supported from the periphery.

Additional rigidity is added to the assembled grill by controlling the distance which the latch members protrude without the cooking area of the section to which they are attached such that the exposed extremities 34 of the peripheral frame members 14a and 14b abut when the sections are in assembled planar relationship.

Achieving this abutment involves additionally, as will be readily appreciated by those skilled in the art, the offsetting of the positions of the elongated body sections a distance equal to their width. Elongated body section 22b, for example, at its intersection with food-contacting member 16b, will be approximately the width of section 22b closer to peripheral frame member 12b than will be body section 28a at its intersection with food-contacting member 16a' to peripheral frame 12a.

Figure 4:
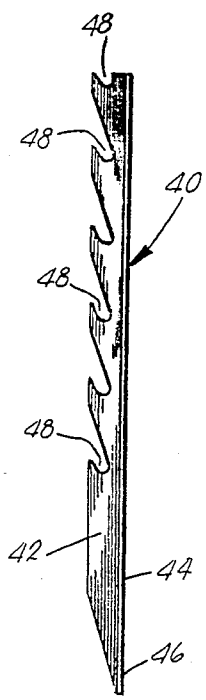
FIG. 4 is a side elevation illustrating the preferred form of the support.

The assembled grill 10, advantageously, can be supported in adjustable, elevated relationship with respect to a bed of charcoal or the like by a plurality of support stakes 40. Referring additionally to FIG. 4, each of the support stakes 40 includes a relatively wide body section 42 having integrally formed therewith by stamping or the like a right-angle reinforcing section 44. Support 40 is pointed at 46 to facilitate its insertion into the ground.

Body section 42 has formed therein a series of upwardly opening recesses 48. The stakes are inserted into the ground and the peripheral frame members 14a and 14b of the assembled grill 10 positioned within recesses 48 at the desired height. By supporting grill 10 from the periphery in this fashion, any downward pressure at its central section is borne by the interaction of the interlock members, as previously described, as well as the abutment of the extremities 34 of the frame members 14a and 14b.

Figure 1:
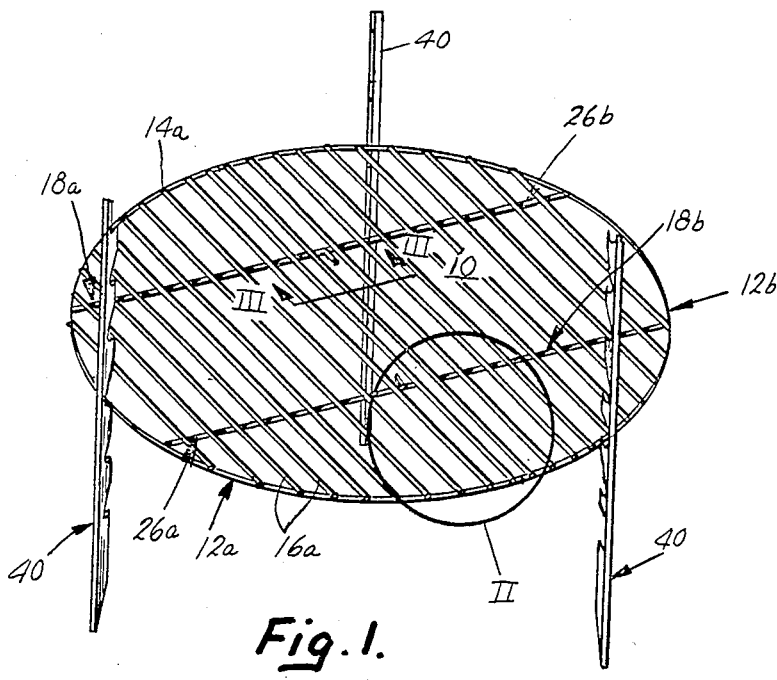
FIG. 1 is a perspective view of the collapsible grill and the supports therefor in assembled condition.
Figure 5:
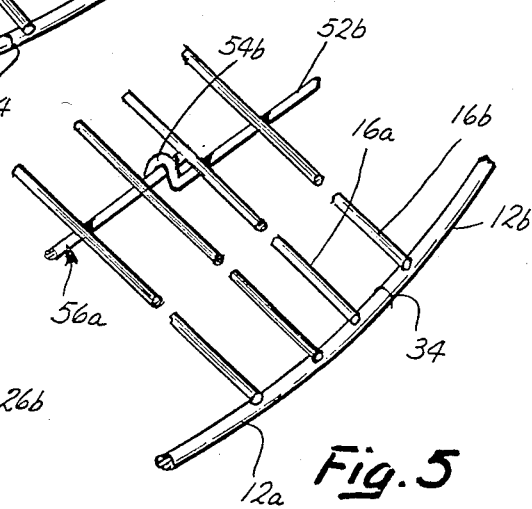
FIG. 5 is an exploded, fragmentary perspective illustrating an alternative, although not preferred, interlock mechanism.

Referring now to FIG. 5, an alternative embodiment of the interlock mechanism is illustrated. This mechanism differs from that illustrated in FIGS. 2 and 3 in that elongated body sections 56a and 56b (the latter not shown) are left straight--i.e., no notch is provided. The necessary height differential is provided in this embodiment by making latch 54b at the extremity of elongated body section 52b in a generally U-shape, the U lying in a plane perpendicular to the axis of elongated body section 52b. Assembly of the sections fabricated in accordance with FIG. 5 is accomplished in the same fashion as assembly of the embodiment illustrated in FIGS. 1-3.

The peripheral frame members, in accordance with the preferred embodiment of this invention are formed from 8 gage steel rod or wire, the interlock members from 10 gage and the food-contacting surfaces from 12 gage (the United States Steel Wire Gage). Support 40, preferably, is fabricated from aluminum having a thickness of approximately 1/16 inch.

The resultant grill is both lightweight and nonbulky. It can be easily assembled, disassembled and cleaned. It is, as will be readily appreciated by those skilled in the art, extremely economical to manufacture and, yet, provides a sturdy cooking surface.

While a preferred embodiment of this invention and a modification thereof have been described in detail, it will be apparent to those skilled in the art that other embodiments and modifications may be conceived and fabricated without departing from the spirit and scope of this invention. Such other embodiments and modifications are to be deemed included within the scope of the appended claims unless these claims, by their language, expressly state otherwise.

The embodiments of the invention in which an exclusive property or privilege is claimed are defined as follows:

1. A collapsible grill comprising a pair of drill sections, each of said sections including a generally U-shaped peripheral frame member; a series of spaced, generally parallel food-contacting members overlying said frame members, each end of each of said food-contacting members being affixed to said frame member, said food-contacting members defining a cooking area within the boundaries of said frame member having at least one straight side; and a pair of spaced interlock members underlying said food-contacting members within said cooking area, each of said interlock members being affixed to said food-contacting members on one of said sections and underlying the food contacting members on the other said section, said interlock members having means for interlocking said sections together with the straight sides thereof adjacent one another so as to form a generally planar cooking surface and wherein said grill sections are identical.

2. A collapsible grill comprising a pair of grill sections, each of said sections including a generally U-shaped peripheral frame member; a series of spaced, generally parallel food-contacting members overlying said frame members, each end of each of said food-contacting members being affixed to said frame member, said food-contacting members defining a cooking area within the boundaries of said frame member having at least one straight side; and a pair of spaced interlock members underlying said food-contacting members within said cooking area, said interlock members being affixed to said food-contacting members, said interlock members having means for interlocking said sections together with the straight sides thereof adjacent one another so as to form a generally planar cooking surface wherein each of said grill sections is identical and wherein each of said interlock members includes an elongated body section and wherein said interlocking means comprises a generally V-shaped, upwardly opening notch in said elongated body section of one of said pair of spaced interlock members, said notch being positioned between two of said food-contacting members within said cooking area, and a latch at the extremity of said elongated body section on the other of said spaced interlock members, said latch extending without said cooking area beyond said straight side, the latch of one of said sections being received by the notch of the other of said sections and vice versa when said sections are assembled to form said planar cooking surface.

3. The collapsible grill as set forth in claim 2 wherein a portion of the elongated body section of said other interlock member underlies at least one of the food-contacting members on the other of said sections when said sections are interlocked together to form said generally planar cooking surface.

4. The collapsible grill as set forth in claim 3 wherein the extremities of the peripheral frame members abut when said sections are interlocked together.

5. The collapsible grill as set forth in claim 4 wherein the latch on each of said sections comprises a generally right angle bend at the extremity of the elongated body section of said other spaced interlock member, said sections being assembled into said planar cooking surface by placing them at an acute angle with respect to one another, protruding the latch of each between the adjacent food-contacting members of the other at said notch; shifting said sections sideways with respect to one another to nest said latches within said notches and bring said elongated body section of said interlock members into contact with one another and thereafter pivoting said sections into planar relationship.

6. The collapsible grill as set forth in claim 4 which further comprises a plurality of supports for retaining said grill in adjustable, elevated relationship with respect to a bed of charcoal or the like, each of said supports including a series of vertically spaced, upwardly opening recesses within which the peripheral frame members of each of said sections is adapted to rest.

7. The combination as set forth in claim 6 wherein the lower extremities of said supports are pointed to facilitate insertion of them into the ground.

8. A collapsible grill comprising a pair of grill sections, each of said sections including a generally U-shaped peripheral frame member; a series of spaced, generally parallel food-contacting members overlying said frame members, each end of each of said food-contacting members being affixed to said frame member, said food-contacting members defining a cooking area within the boundaries of said frame member having at least one straight side; a pair of spaced interlock members underlying said food-contacting members within said cooking area, said interlock members being affixed to said food-contacting members, said interlock members having means for interlocking said sections together with the straight sides thereof adjacent one another so as to form a generally planar cooking surface; and a plurality of supports for retaining said grill in adjustable, elevated relationship with respect to a bed of charcoal or the like, each of said supports including a series of vertically spaced, upwardly opening recesses within which the peripheral frame members of each of said sections is adapted to rest.

9. The combination as set forth in claim 8 wherein the lower extremities of said supports are pointed to facilitate insertion of them into the ground.

10. A collapsible grill and support combination comprising:
- a pair of grill sections, each of said sections including a generally U-shaped peripheral frame member; a series of spaced food-contacting members overlying said frame member, each end of each of said food-contacting members being affixed to said frame member, said food-contacting members defining a cooking area within the boundaries of said frame member having at least one straight side;
- at least one interlock member on one of said sections said interlock member including means for interlocking said sections together with the straight sides thereof adjacent one another so as to form a generally planar cooking surface; and
- a plurality of supports for retaining said grill in adjustable, elevated relationship with respect to a bed of charcoal or the like, each of said supports including a series of vertically spaced, upwardly opening recesses within which the peripheral frame members of each of said sections is adapted to rest.

11. The combination as set forth in claim 10 wherein the lower extremities of said supports are pointed to facilitate insertion of them into the ground.

12. A collapsible grill comprising a pair of unconnected grill sections, each of said sections including a generally U-shaped peripheral frame member; a series of spaced, generally parallel food-contacting members overlying said frame members, each end of each of said food-contacting members being affixed to said frame member, said food-contacting members defining a cooking area within the boundaries of said frame member having at least one straight side; and means for interconnecting said sections together with said straight sides adjacent each other to form a generally planar cooking surface, said interconnecting means including at least two latching members, each of said latching members being affixed to one of said sections and one of said latching members protruding from said cooking area at said straight side, 13. The collapsible grill as set forth in claim 12 wherein the extremities of the peripheral frame members abut when said sections are interlocked together.

14. A collapsible grill comprising a pair of grill sections, each of said sections including a generally U-shaped peripheral frame member; a series of spaced, generally parallel food-contacting members overlying said frame members, each end of each of said food-contacting members being affixed to said frame member, said food-contacting members defining a cooking area within the boundaries of said frame member having at least one straight side; and a pair of spaced interlock members underlying said food-contacting members within said cooking area, said interlock members being affixed to said food-contacting members, said interlock members having means for interlocking said sections together with the straight sides thereof adjacent one another so as to form a generally planar cooking surface;
- wherein at least one of said interlock members on at least one of said sections underlie and support the innermost of said food-contacting members on the other of said sections when said sections are interlocked so as to form said generally planar cooking surface; and
- wherein said one interlock member is pivotally affixed to an interlocking member on the other of said sections at a point between food-contacting members on the other of said sections.

* * * * *

UNITED STATES PATENT AND TRADEMARK OFFICE
CERTIFICATE OF CORRECTION

PATENT NO. : 4,688,543
DATED : August 25, 1987
INVENTOR(S) : Robert J. Kopke

It is certified that error appears in the above-identified patent and that said Letters Patent is hereby corrected as shown below:

Column 2, Line 52:

After "notches" insert -- . --;

Column 3, Claim 1, Line 66:

"drill" should be -- grill --;

Column 6, Claim 12, Line 21:

"side," should be -- side. --.

Signed and Sealed this

Twenty-ninth Day of December, 1987

Attest:

DONALD J. QUIGG

*Attesting Officer*    *Commissioner of Patents and Trademarks*